(12) United States Patent
Neitzel et al.

(10) Patent No.: US 6,251,153 B1
(45) Date of Patent: Jun. 26, 2001

(54) CENTRIFUGAL AIR FILTER

(75) Inventors: Emery W. Neitzel, Rothschild; Alan L. Breitenfeldt; Jared C. Wesenick, both of Wausau, all of WI (US)

(73) Assignee: Greenheck Fan Corporation, Schofield, WI (US)

(*) Notice: Subject to any disclaimer, the term of this patent is extended or adjusted under 35 U.S.C. 154(b) by 0 days.

(21) Appl. No.: 09/345,592

(22) Filed: Jun. 30, 1999

(51) Int. Cl.$^7$ .................................................. B01D 45/12
(52) U.S. Cl. .............................. 55/346; 55/435; 55/436; 55/447; 55/DIG. 36
(58) Field of Search .......................... 55/345, 346, 435, 55/436, 447, DIG. 36

(56) References Cited

U.S. PATENT DOCUMENTS

| | | |
|---|---|---|
| 2,039,692 | 5/1936 | Van Tongren . |
| 2,701,056 | 2/1955 | Morton . |
| 2,752,001 | 6/1956 | Muller . |
| 3,164,445 | 1/1965 | Hampel . |
| 3,260,189 | 7/1966 | Jensen . |
| 3,364,664 * | 1/1968 | Doane ........................................ 55/436 |
| 3,376,804 | 4/1968 | Marks . |
| 3,393,497 | 7/1968 | Donnelly . |
| 3,566,585 | 3/1971 | Voloshen et al. . |
| 3,813,856 | 6/1974 | Jensen . |
| 3,834,135 | 9/1974 | Jordan . |
| 3,841,062 | 10/1974 | Molitor et al. . |
| 3,870,494 | 3/1975 | Doane . |
| 3,890,124 * | 6/1975 | Howes .......................... 55/DIG. 36 |
| 3,910,782 | 10/1975 | Struble et al. . |
| 4,038,056 | 7/1977 | Diachuk et al. . |
| 4,239,513 | 12/1980 | Paul et al. . |
| 4,319,898 | 3/1982 | Maierhofer . |
| 4,375,365 | 3/1983 | Müller et al. . |
| 4,397,226 | 8/1983 | Lind . |
| 4,407,266 | 10/1983 | Molitor . |
| 4,720,291 | 1/1988 | London . |
| 4,846,856 | 7/1989 | Burger et al. . |
| 4,872,892 | 10/1989 | Vartianen et al. ........................ 55/345 |
| 5,302,174 | 4/1994 | Guetersloh . |
| 5,322,470 | 6/1994 | Vartainen et al. . |
| 5,470,365 | 11/1995 | Jang . |
| 5,738,712 | 4/1998 | Hyppanen . |

FOREIGN PATENT DOCUMENTS

| | | |
|---|---|---|
| 460983 | 5/1928 | (DE) . |
| 2737386 | 3/1978 | (DE) . |
| 2718611 | 11/1978 | (DE) . |
| 471267 | 5/1952 | (IT) . |
| 57-11692 * | 3/1982 | (JP) ................................ 55/DIG. 36 |

OTHER PUBLICATIONS

Dustex Corporation Publication published prior to Apr. 1966.

Louis Theodore et al., Air Pollution Control Equipment, vol. I, Chapter 4 (CRC Press 1988).

* cited by examiner

Primary Examiner—David A. Simmons
Assistant Examiner—Robert A. Hopkins
(74) Attorney, Agent, or Firm—Quarles & Brady LLP

(57) ABSTRACT

The present invention provides a centrifugal air filter suitable for extracting impurities suspended in air. The filter includes a front wall, a rear wall spaced from the front wall, and a perimeter wall joining the front and rear walls and forming a cavity therebetween. Dividers divide the cavity into a plurality of vortex chambers. Each vortex chamber has a pair of inlets proximal opposing chamber ends and formed in the filter front wall, and an outlet formed in the filter rear wall generally centrally disposed between the inlets. Each vortex chamber extracts impurities by directing the air along a helical path through the vortex chamber from the inlets to the outlet. Air enters the vortex chamber inlets in the front of the filter, and exits the vortex outlet at the rear of the filter in the same plane.

18 Claims, 3 Drawing Sheets

US 6,251,153 B1

CENTRIFUGAL AIR FILTER

CROSS REFERENCES TO RELATED APPLICATIONS

Not Applicable

STATEMENT REGARDING FEDERALLY SPONSORED RESEARCH

Not Applicable

BACKGROUND OF THE INVENTION

The field of the invention is centrifugal air filters, and more particularly, centrifugal grease extractors for commercial kitchens.

Centrifugal air filters are used to extract impurities suspended in air by causing the air to enter a helical path in a vortex chamber and subjecting the impurities to a centrifugal force. The impurities are propelled away from the vortex center and impinge upon chamber walls. The air exits the vortex chamber leaving the impurities behind in the chamber.

One particular use for centrifugal air filters is to extract impurities, such as grease, from grease-laden air formed in commercial kitchens during cooking. These grease extractors are typically a cleanable or replaceable component of kitchen ventilation systems disposed above a cooking area, such as a stove or the like. A fan in the ventilation system draws grease-laden air through the filter which extracts the grease from the air prior to exhausting the air into the atmosphere. The extracted grease runs down the filter walls and is collected for proper disposal.

One prior art centrifugal air purifier disclosed in U.S. Pat. No. 4,872,892, has parallel vortex chambers. Each chamber has a pair of inlets formed in the filter front. The grease-laden air enters one of the chambers through the chamber inlets and exits substantially perpendicular to the direction of entering air through outlets in the chamber ends. This particular configuration allows at least a portion of the grease-laden air to pass directly from the inlet to the outlet without being subject to the vortex action necessary to release the grease suspended in the air. Furthermore, this particular application cannot be mounted in a standard baffle filter hood. Because the ends of the filter must remain open, a special mounting bracket is required.

SUMMARY OF THE INVENTION

The present invention provides a centrifugal air filter suitable for extracting impurities suspended in air. The filter includes a front wall, a rear wall spaced from the front wall, and a perimeter wall joining the front and rear walls forming a cavity therebetween. Dividers divide the cavity into a plurality of vortex chambers. Each vortex chamber has a pair of inlets proximal opposing chamber ends and formed in the filter front wall, and an outlet formed in the filter rear wall generally centrally disposed between the inlets.

A general objective of the present invention is to provide an air filter having an improved extraction efficiency. By providing an air filter having a vortex chamber with front inlets disposed proximal each chamber end and a centrally disposed rear outlet, air entering the vortex chamber cannot pass through the chamber without entering a helical path.

Another objective of the present invention is to provide an air filter which is easy to assemble. By forming the vortex chambers with dividers and interlocking adjacent dividers with tabs and slots formed on the dividers, the need to secure each vortex chamber to a base is eliminated and the filter assembly is simplified.

These and other objects and advantages of the invention will be apparent from the description that follows. In the description reference is made to the accompanying drawings which form a part hereof and in which there is shown by way of illustration embodiments of the invention. Such embodiments do not necessarily represent the full scope of the invention. Reference should therefore be made to the claims herein for interpreting the scope of the invention.

DESCRIPTION OF THE PREFERRED EMBODIMENT

Figure 1:
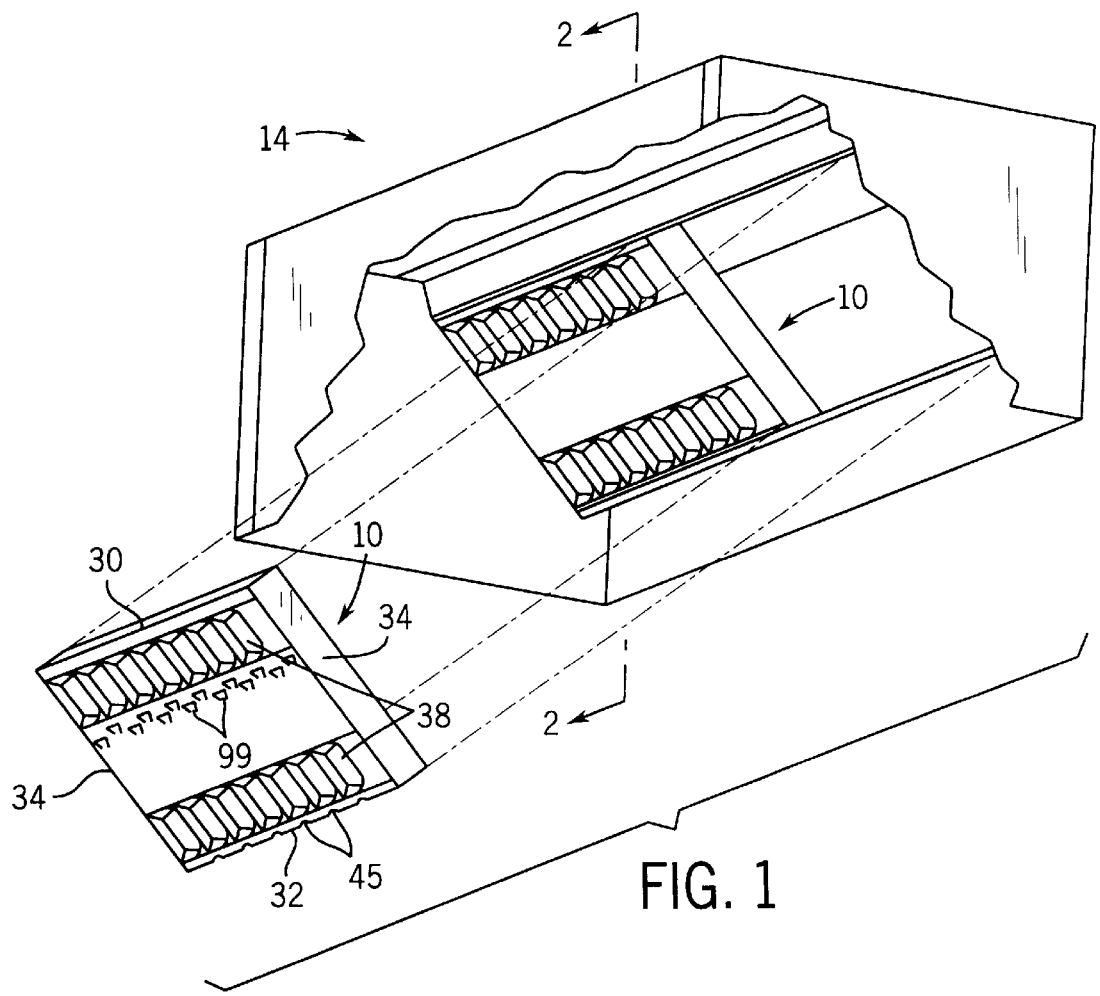
FIG. 1 is an exploded perspective view with parts cut away of a ventilation hood incorporating the present invention.
Figure 2:
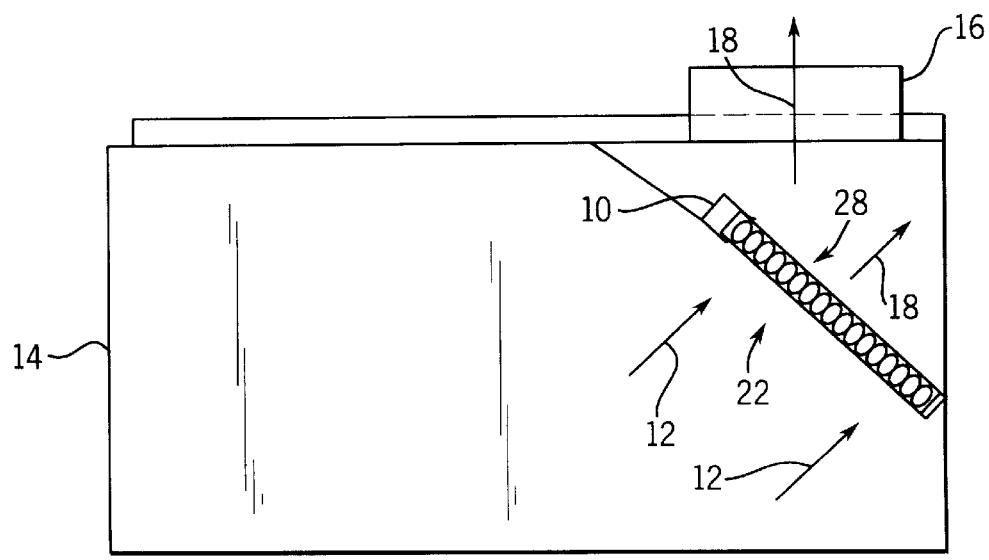
FIG. 2 is a cross sectional view along line 2—2 of the ventilation hood of FIG. 1.

As shown in FIGS. 1 and 2, a centrifugal air filter 10 suitable for extracting grease from grease-laden air 12 is mounted on an angle in a ventilation hood 14 disposed above a food cooking area (not shown). A fan (not shown) draws grease-laden air 12 into the hood 14, through the air filter 10, and expels the cleaned air 18 out of the hood 14 through a duct collar 16.

Figure 3:
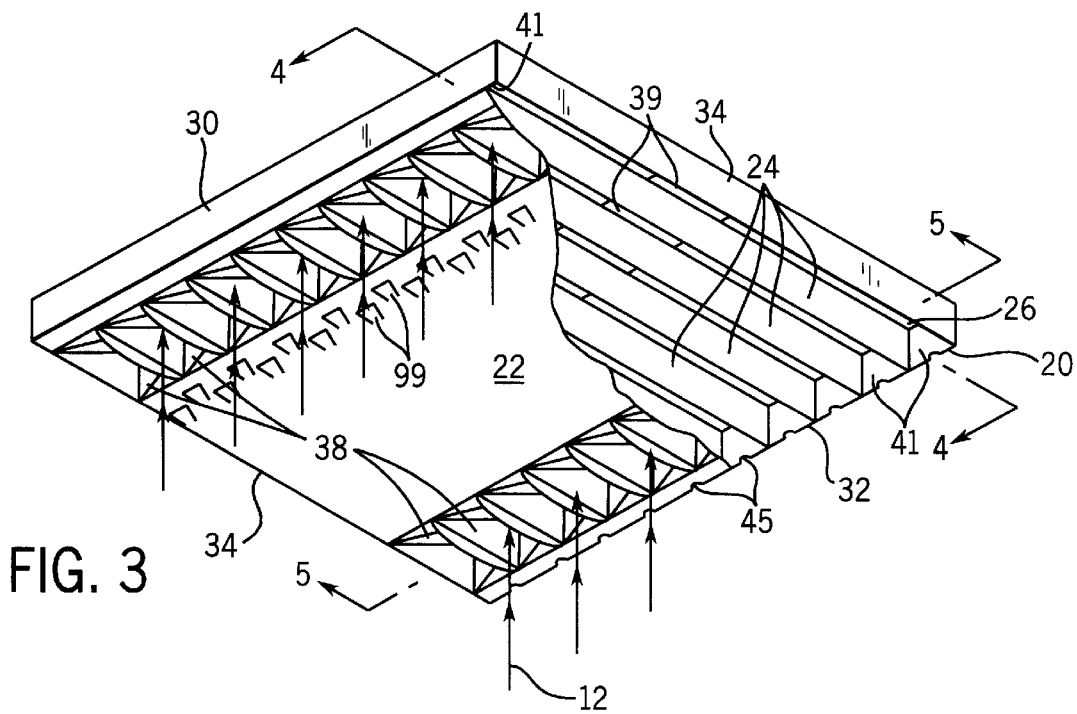
FIG. 3 is a cut away front perspective view of the air filter which forms part of the hood of FIG. 1.
Figure 4:
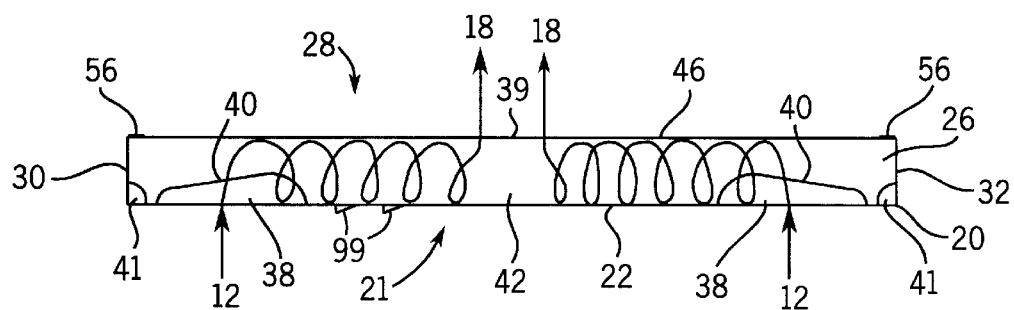
FIG. 4 is a cross sectional view along line 4—4 of the air filter of FIG. 3.
Figure 5:
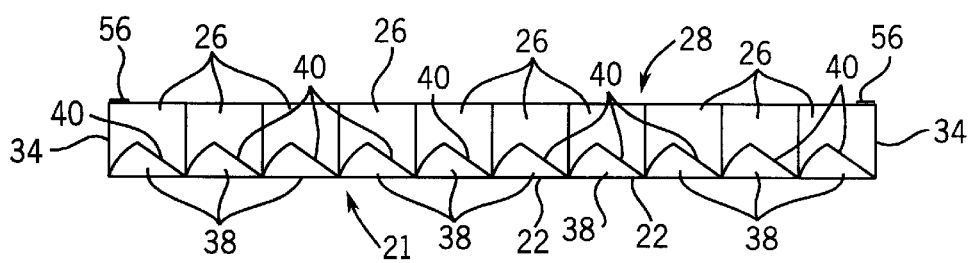
FIG. 5 is a cross sectional view along line 5—5 of the air filter of FIG. 3.
Figure 6:
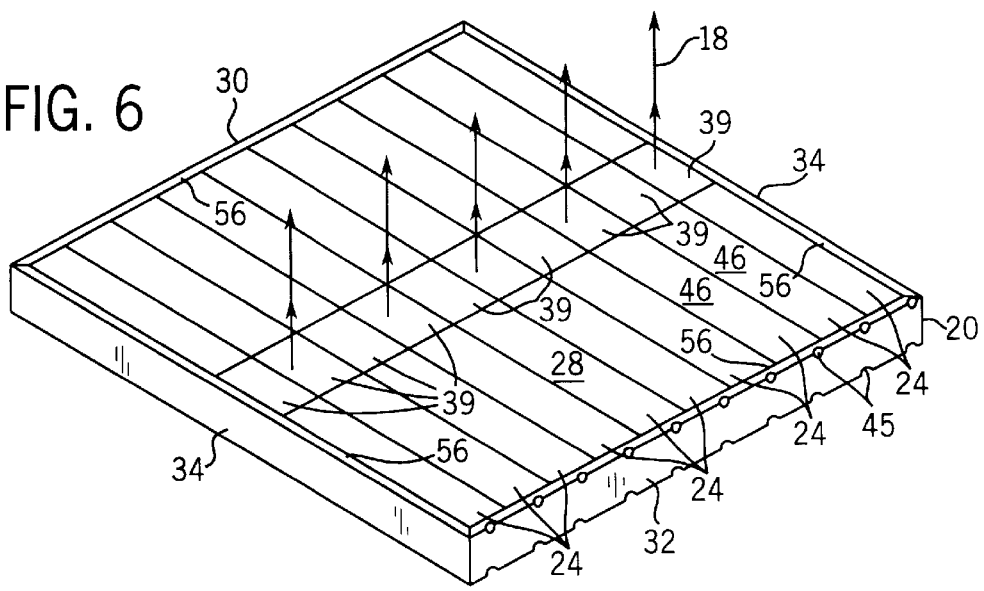
FIG. 6 is a rear perspective view of the air filter of FIG. 3.

Referring particularly to FIGS. 3–5, the air filter 10 has a front wall 22 and a rear wall 28 joined at its perimeter by a top wall 30, bottom wall 32, and opposing sidewalls 34. The cavity formed by the walls 22, 28, 30, 32, and 34 is divided into a plurality of separate vortex chambers 26.

Each vortex chamber 26 has a pair of inlets 38 located at opposite ends 41 of the vortex chambers 26, and a single outlet 39 located at the midpoint of the chamber 26. Grease-laden air 12 enters a vortex chamber 26 through the pair of inlets 38 formed in the filter front wall 22, and exits the chamber 26 through the outlet 39 formed in the filter rear wall 28. The filter 10 captures the grease by directing the grease-laden air 12 along a helical path through the vortex chambers 26. The helical path causes the grease particles suspended in the air to impinge against the chamber walls and then flow along the chamber wall to a collection point. Forming the inlets 38 proximal opposing chamber ends 41 prevents the air 12 entering each inlet 38 from passing directly to the outlet 39 and avoiding the helical path. This ensures the maximum amount of grease is extracted from the air.

Figure 7:
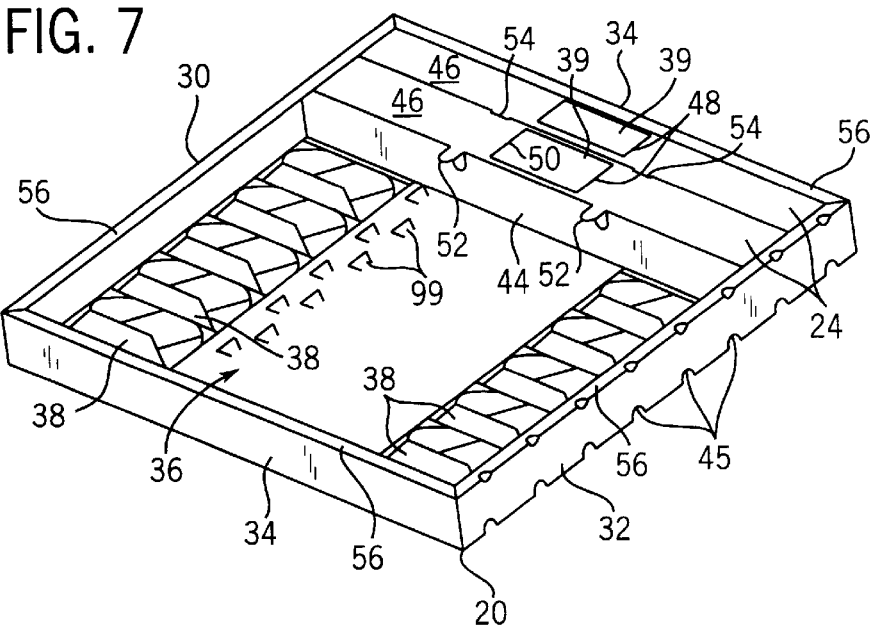
FIG. 7 is a rear perspective view of a partially assembled air filter of FIG. 3.

Referring particularly to FIGS. 3 and 7, in the preferred embodiment, the filter 10 includes a tray-shaped base 20 with the filter front wall 22, and a top wall 30, bottom wall 32, and side walls 34 defining the filter perimeter. The walls 30, 32, and 34 extend rearwardly and substantially perpendicular from the front wall 22 to form a tray cavity 36. Dividers 24 dividing the cavity 36 and defining the vortex chambers 26 in cooperation with the base 20 are mounted in the cavity 36. The base 20 is preferably formed from a single sheet of material to eliminate seams and facilitate cleaning the filter front wall 22.

The pairs of inlets 38 are formed in the front wall 22 and provide an entry for the grease-laden air 12 into the chambers 26. The inlet pairs 38 are spaced along the front wall substantially parallel to the base side walls 34. Preferably, the front wall 22 is deformed rearward to form vortex generators 40 at each inlet 38. The vortex generators 40 direct air 12 entering the inlet 38 into a helical path inside the chamber 26 toward the chamber center 42.

The dividers 24 are retained in the cavity 36 by folding flaps 56 over the dividers 24 inserted therein. Looking particularly at FIG. 4, the flaps 56 are formed on rear edges of the base top 30, bottom 32, and sides 34 which are folded over to retain the interlocked dividers 24 in the base cavity 36. Advantageously, folding the flaps over the dividers minimize air leaks from the chambers 26. The flaps 56 are secured at each base corner and sides using methods known in the art, such as using tack welds, spot welds, screw type fasteners, and the like, to prevent the flaps 56 from inadvertently releasing the dividers 24.

Grease impinged onto the vortex chamber walls drains out of the chamber 26 through apertures 45 punched in the base bottom 32 at the end 41 of each chamber 26. During heavy grease loading of the filter, similar to heavy duty cooking, the vortex generators 40 can become loaded with grease. This heavy loading of grease may develop into runs down the front wall 22. To prevent the runs from running completely down the entire front face 22, small louvers 99 are formed, such as by punching, into the front face just below the vortex generators 40 at each inlet 38 proximal the filter top. Two rows of staggered louvers 99 are used to cover the entire surface (left to right). The staggered louvers 99 assure any runs from the vortex generators 40 will be caught by a louver.

The louvers need only be formed on the top portion of the filter, and not the bottom, making the filter top to bottom orientation specific. However, if the louvers are not required, the apertures 45 can be punched in the base top 30 and bottom 32 allowing the filter 10 to be mounted in the hood 12 without reference to the filter top 30 or bottom 32 orientation.

Figure 8:
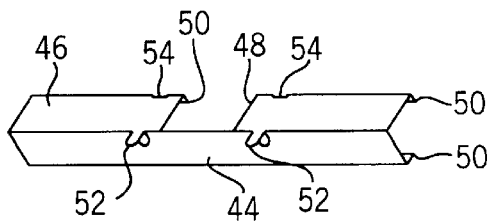
FIG. 8 is a perspective view of a divider shown in FIG. 7.

To simplify filter 10 assembly and reduce assembly costs, the vortex chambers 26 are formed by interlocking dividers 24 which are inserted into the cavity 36. Looking particularly at FIGS. 7–8, the elongated L-shaped dividers 24 are inserted into the tray cavity 36 and cooperate with the base 20 and adjacent dividers 24 to form the elongated vortex chambers 26. Each divider 24 extends the width of the base 20 and has a side wall 44 substantially parallel to the base side walls 34 and a rear wall 46 substantially parallel to the front wall 22 to form the filter rear wall 28. The rear wall 46 of each divider 24 is disposed above a different pair of inlets 38 and has a notch 48 formed generally centrally therein defining the chamber outlet 39. Edges 50 of the divider rear wall 46 and side walls 44 are bent inward and abut the base 20 or adjacent divider 24 to minimize air leaks.

The dividers 24 are preferably formed from the same material using the same processes as the base 20 and are interlocked to simplify filter 10 assembly. Tabs 52 formed in each divider 24 extend into slots 54 formed in the adjacent divider 24 to lock adjacent dividers 24 together. The tab and slot construction eliminates a need to spot weld or otherwise secure each individual divider 24 in the cavity 36.

By providing a vortex chamber 26 having front inlets 38 and a rear outlet 39, the air enters and exits the filter 10 in substantially parallel directions to provide additional advantages. This arrangement provides a more compact filter 10 relative to an air filter in which the air exits the air filter substantially perpendicular to the air entering the filter, such as through the chamber ends. Furthermore, a rear outlet air filter does not require a specially adapted ventilation hood to channel air exiting the chamber ends into the hood.

In another embodiment, the base, dividers or portions thereof are coated with a dry lubricant, such as described in copending U.S. patent application Ser. No. 09/094,745 filed on Jun. 15, 1998, to facilitate cleaning. U.S. patent application Ser. No. 09/094,745 is hereby fully incorporated herein by reference.

While there has been shown and described what are at present considered the preferred embodiments of the invention, it will be apparent to those skilled in the art that various changes and modifications can be made therein without departing from the scope of the invention.

We claim:

1. A centrifugal air filter suitable for extracting impurities suspended in air, said filter comprising:
   a front wall;
   a rear wall spaced from said front wall;
   a perimeter wall joining said front and rear walls forming a cavity therebetween;
   at least one divider extending between said front wall and said rear wall in said cavity and defining more than one elongated vortex chamber;
   wherein at least one of said vortex chambers includes,
      a pair of inlets formed in said front wall, each inlet of said pair of inlets being proximal an opposing end of said one vortex chamber; and
      an outlet formed in said rear wall substantially midway between each end of said one vortex chamber, wherein a fluid entering one of said inlets of said one vortex chamber flows longitudinally through said one vortex chamber and out of said outlet.

2. The air filter as in claim 1, wherein said rear wall is substantially parallel to said front wall.

3. The air filter as in claim 1, wherein said filter has a plurality of dividers dividing said cavity into a plurality of vortex chambers.

4. The air filter as in claim 1, wherein a rear wall of said divider forms at least a part of said filter rear wall.

5. The air filter as in claim 1, wherein said perimeter wall includes a top wall, bottom wall and opposing sidewalls.

6. The air filter as in claim 5, wherein one of said inlets in each inlet pair is adjacent said base top wall and the other inlet in each said inlet pair is adjacent said base bottom wall.

7. The air filter as in claim 1, wherein at least a portion of said filter is coated with a dry lubricant.

8. The air filter as in claim 1, wherein an aperture is formed in said perimeter wall at an end of each vortex chamber, wherein said aperture provides a drain for said impurities extracted by said filter.

9. The air filter as in claim 1, wherein flaps formed on an edge of said perimeter wall retain said divider in said cavity.

10. A centrifugal air filter suitable for extracting impurities suspended in air, said filter comprising:
    a front wall;

a rear wall spaced from said front wall;

a perimeter wall joining said front and rear walls forming a cavity therebetween;

a first divider dividing said cavity into more than one vortex chamber and forming at least a portion of said rear wall, wherein at least one tab extending from said first divider is received in a slot formed in an adjacent divider and interlocks said adjacent divider with said first divider;

an inlet formed in said front wall which provides a passageway into at least one of said vortex chambers; and an outlet formed in said rear wall which provides a passageway out of said one vortex chamber.

11. A centrifugal air filter suitable for extracting impurities suspended in air, said filter comprising:

a front wall;

a rear wall spaced from said front wall;

a perimeter wall joining said front and rear walls forming a cavity therebetween;

at least one divider extending between said front wall and said rear wall in said cavity and defining more than one vortex chamber;

a pair of inlets formed in said front wall, each inlet of said pair of inlets being proximal an opposing end of at least one of said vortex chambers; and an outlet formed in said rear wall, and positioned substantially midway between said opposing ends of said one vortex chamber, wherein a vortex generator is formed in at least one of said inlets.

12. A centrifugal air filter suitable for extracting impurities suspended in air, said filter comprising:

a front wall;

a rear wall spaced from said front wall;

a perimeter wall joining said front and rear walls forming a cavity therebetween;

at least one divider extending between said front wall and said rear wall in said cavity and defining more than one vortex chamber;

an inlet formed in said front wall which provides a passageway into at least one of said vortex chambers;

an outlet formed in said rear wall which provides a passageway out of said one vortex chamber; and at least one louver formed in said front wall proximal said inlet for catching grease running down said front wall.

13. A centrifugal air filter suitable for extracting impurities suspended in air, said filter comprising:

an elongated air filter chamber having a closed front, rear and closed opposing ends;

a pair of inlets formed in said air filter chamber front, each inlet of said pair of inlets being located adjacent one of said air filter chamber ends; and an outlet formed in said chamber rear and located substantially midway between the opposing ends, wherein air enters said air filter chamber through said inlets and flows longitudinally toward said outlet through said air filter chamber in a helical path, wherein said helical path causes impurities in said air to impinge upon walls of said air filter chamber prior to said air exiting said air filter chamber through said outlet.

14. The air filter as in claim 13, wherein said impinged impurities flow along said air filter chamber walls and out of said air filter chamber through one or more apertures formed in at least one end of said air filter chamber.

15. The air filter as in claim 13, wherein a vortex generator is formed in at least one of said inlets.

16. The air filter as in claim 13, which includes a plurality of air filter chambers and wherein said air filter chambers are disposed adjacent to each other.

17. The air filter as in claim 13, wherein at least a portion of said filter is coated with a dry lubricant.

18. A centrifugal air filter suitable for extracting impurities suspended in air, said filter comprising:

an elongated air filter chamber having a front rear and closed opposing ends;

a pair of inlets formed in said air filter chamber front, each inlet of said pair of inlets being located adjacent one of said air filter chamber ends;

an outlet formed in said chamber rear and located substantially midway between the opposing ends, wherein air enters said air filter chamber through said inlets and flows toward said outlet through said air filter chamber in a helical path, wherein said helical path causes impurities in said air to impinge upon walls of said air filter chamber prior to said air exiting said air filter chamber through said outlet, and at least one louver formed in said front proximal one of said inlets for catching grease running down said front.

* * * * *